March 22, 1949.  F. E. CLEVELAND  2,465,063
SELF-ADJUSTING BRAKE

Filed April 25, 1947  2 Sheets-Sheet 1

INVENTOR.
Flournoy E. Cleveland
BY
McMorrow, Berman & Davidson
ATTORNEYS

March 22, 1949.   F. E. CLEVELAND   2,465,063
SELF-ADJUSTING BRAKE
Filed April 25, 1947   2 Sheets-Sheet 2
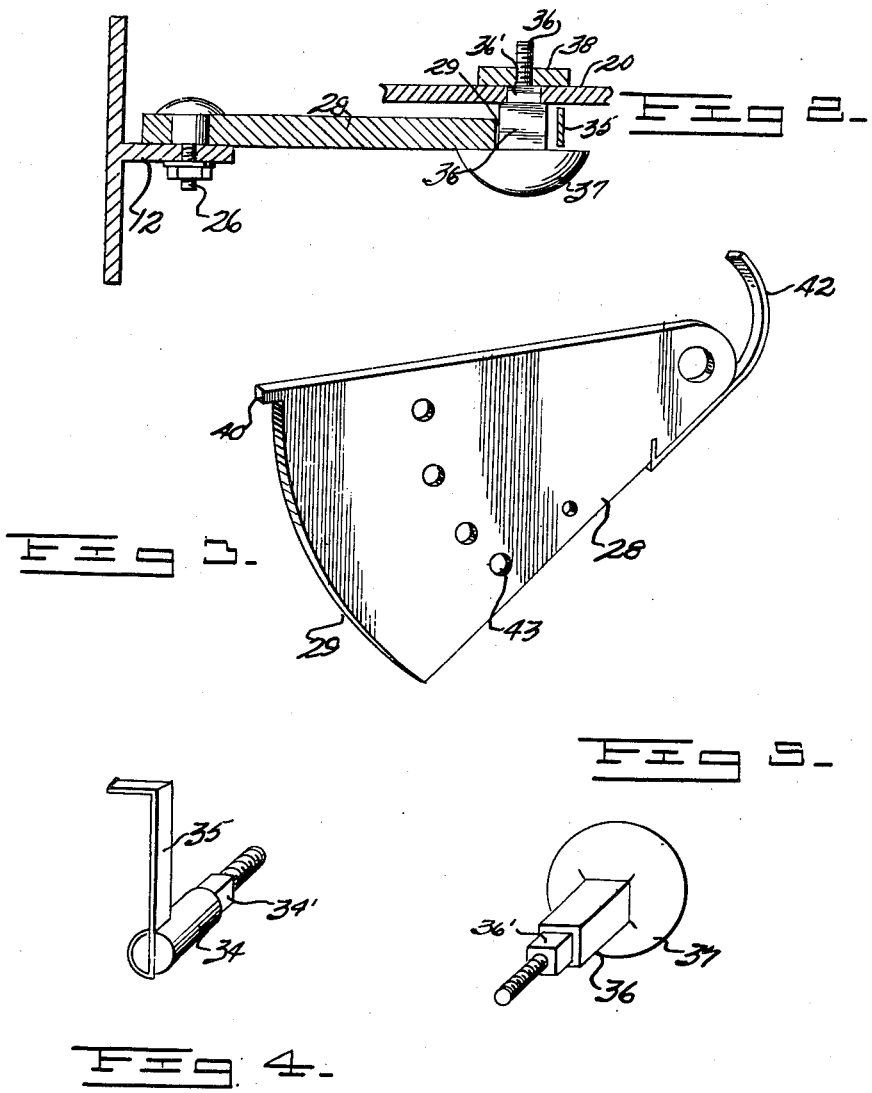
INVENTOR.
Flournoy E. Cleveland
BY
McMorrow, Berman & Davidson
ATTORNEYS Patented Mar. 22, 1949

2,465,063

UNITED STATES PATENT OFFICE 2,465,063

SELF-ADJUSTING BRAKE

Flournoy E. Cleveland, Rocky Mount, N. C.

Application April 25, 1947, Serial No. 743,924

1 Claim. (Cl. 188—79.5)

This invention relates to wheel brakes, and more particularly to automatic means for adjusting brakes to compensate for wear.

Normally, when a brake shoe wears, the spacing between it and the drum must be altered to give the proper positioning for effective operation; this requires expensive machinery and skilled mechanics.

A principal object of this invention is to provide means for automatically making this adjustment so that the predetermined proper positioning is always maintained.

The accompanying drawings illustrate a preferred embodiment of the invention.

Figure 2 is a fragmentary horizontal section through the brake.

Figure 3 is a perspective view of the wedge member that provides automatic adjustment.

Figure 4 is a perspective view of a spring attachment for the wedge member.

Figure 5 is a perspective view of a pin for engaging the spring member of Figure 4.

Figure 1:
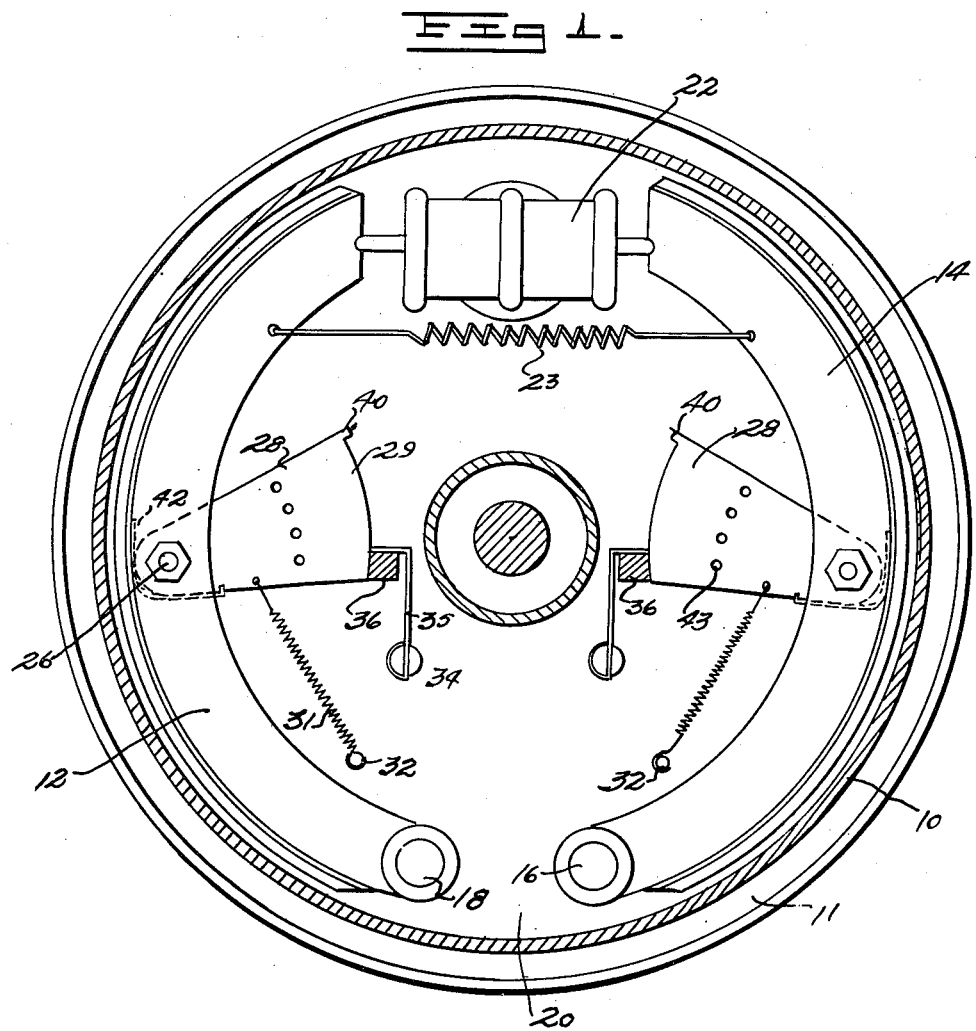
Figure 1 is a vertical view, partially in section, of a wheel brake constructed in accordance with the principles of the invention.

With particular reference to the drawings, a brake drum 10 is arranged on a wheel 11 to cooperate internally with the external surface of two brake shoes 12 and 14 mounted by means of anchor pins 16 and 18, respectively, on a backing plate 20. A hydraulic wheel cylinder actuator 22 is designed to move the shoes 12 and 14 outwardly into contact with the inner surface of the drum 10.

A spring 23 fastened to both of the shoes 12 and 14 normally pulls them together, away from the drum 10, so that when the brake-applying pressure is relieved from the actuator 22, the spring 23 will return the shoes 12 and 14 to inoperative position.

Pivoted on each brake shoe by means of a horizontal pivot 26 is a wedge-shaped member 28, the wider portion of the wedge being movable about the pivot 26. The rim 29 of the outer portion is arcuate, with its radius from the pivot 26 increasing upwardly, for a purpose to be more fully described hereinafter.

The wedge 28 is urged downwardly by a spring 31, fastened at one end 32 to the backing plate 20.

Fastened to the backing plate 20 by a slotted screw 34 is a strong leaf spring 35, wh'ch is angularly bent in such a manner as to bear one end thereof against a square-shanked pin 36. The p'n 36 has an enlarged head 37. which is spaced from the backing plate 20 by the length of the square shank. The wedge 28 is adapted to abut its outer rim 29 against the end of the spring 35 and against the square shank of the pin 36 between the enlarged head 37 and the backing plate 20. The backing plate 20 has a square hole 40 to accommodate an intermediate reduced square portion 36' of the pin 36 to prevent the latter from turning with respect to the backing plate 20. The backing plate 20 and the pin 36 are fastened together by means of a nut 38 on the threaded end of the pin 36. The screw 34 has an intermediate square portion 34' adapted to engage a similar opening in the backing plate 20 to secure the screw 34 against rotation, and a reduced threaded portion at the end thereof by wh'ch the screw may be fastened to the backing plate 20 by a nut on the back of the backing plate 20.

The top of the rim 29 of each wedge 28 is provided with an extension 40 that acts as a stop to limit its downward movement, as will be described more particularly hereinafter.

The tapered small portion of each wedge 28 has a spring guide 42 to aid in positioning it about its pivot 26, and also to urge the wedge 28 downwardly, and the intermediate portion is provided with a series of apertures 43, in conjunction with a similar aperture or apertures in the backing plate 20, to permit disassembly of the parts.

In the operation of the device, the drum 10, the shoes 12 and 14, and the wedges 28 are adjusted so that in the relaxed position of the shoes the rim 29 of each wedge 28 will just reach and bear against the square portion of its pin 36 and against the end of the spring 35, the main portion of the spring 35 being spaced from the pin 36, as shown in Figure 1.

The rim 29 of the wedge 28 will bear against the end of the spring 35 at all times and against the square portion of the pin 36 only in the relaxed position. When the brakes are applied, the spring 35 will be resilient enough to follow the rim 29, which by now will be slightly separated from the pin 36, until the main portion of the spring 35 comes to rest against the pin 36. The spring 35 will prevent downward movement of the wedge 28 until the wear is enough to permit the spring 31 or the spring guide 42 to swing the wedge 28 downwardly to make contact with the square shank of the pin 36 when the brakes are in relaxed position. Of course, in the relaxed position, the distance between the pin 36 and the main portion of the spring 35, as is indicated in Flge 1, amounts to the clearance between the drum 10 and the shoes 12 and 14.

Thereafter, as the shoe wears, the spring 31 and the spring guide 42 will pull the rim 29 downwardly, so that the increased radius of the rim 29 will force the pivot 26 closer to the drum 10 to compensate for the wear of the shoe. This adjustment will be automatic, and will always be to an extent sufficient and necessary to compensate for the wear of the shoe.

It is obvious that various changes may be made in the form of the invention, only a preferred embodiment being shown.

What is claimed is:

In a brake comprising a brake drum for a wheel, at least one brake shoe movably mounted and having an arcuate portion for engaging against the interior of the brake drum, and a spring for releasing the brake shoe from said brake drum, the features which include a wedge pivoted at the narrow end thereof to the intermediate portion of the brake shoe and having the inner end directed substantially toward the center of the wheel and terminating in an arcuate edge disposed at increasingly greater radial distance from the pivoted end in the upward or counter-clockwise direction, a stop projecting radially outward at the upper end of the arcuate edge, a fixed stop member disposed in effective position to engage against said arcuate edge, a spring biasing the wedge downward in clockwise direction about the pivot thereof, and a leaf spring having one end supported in spaced relation to the stop member and the other end bent to extend over the latter and make frictional contact of the extremity thereof with said arcuate edge of the pivoted wedge in order to impede clockwise movement of the latter.

FLOURNOY E. CLEVELAND.

REFERENCES CITED

The following references are of record in the file of this patent:

UNITED STATES PATENTS

| Number | Name | Date |
|---|---|---|
| 1,798,360 | Sneed | Mar. 31, 1931 |
| 2,214,679 | Scott | Sept. 10, 1940 |
| 2,282,620 | Swift | May 12, 1942 |